United States Patent [19]

Keung et al.

[11] 4,369,267

[45] Jan. 18, 1983

[54] PROCESS FOR DISPERSING CARBON BLACK IN POLYETHYLENE

[75] Inventors: Chue-Kwok J. Keung, Dollard des Ormeaux; Donald E. Rathgeber, St. Lambert, both of Canada

[73] Assignee: Union Carbide Canada Limited, Toronto, Canada

[21] Appl. No.: 148,342

[22] Filed: May 9, 1980

[30] Foreign Application Priority Data

Jun. 1, 1979 [CA] Canada ................................. 328965

[51] Int. Cl.$^3$ .......................... B29B 1/04; C08K 3/04; C08J 3/22
[52] U.S. Cl. ................................. 523/351; 524/536; 524/496
[58] Field of Search ...................... 260/42.56; 523/351

[56] References Cited

U.S. PATENT DOCUMENTS

| | | | |
|---|---|---|---|
| 3,418,270 | 12/1968 | Traub | 523/351 |
| 3,422,056 | 1/1969 | Carton | 523/351 |
| 3,533,976 | 10/1970 | Eidman | 260/42.56 |
| 3,685,804 | 8/1972 | Stansfield | 526/88 |
| 3,925,301 | 12/1975 | Engel et al. | 260/37 PC |
| 4,029,633 | 6/1977 | Hagopian et al. | 260/42.55 |
| 4,045,403 | 8/1977 | Lever et al. | 260/42.29 |
| 4,065,426 | 12/1977 | Yamawaki et al. | 260/42.55 |
| 4,148,780 | 4/1979 | Blumel et al. | 260/42.46 |

FOREIGN PATENT DOCUMENTS

| | | |
|---|---|---|
| 1077183 | 5/1980 | Canada . |
| 11242 | 5/1980 | European Pat. Off. . |
| 13872 | 8/1980 | European Pat. Off. . |

OTHER PUBLICATIONS

Derwent Abst. 38621c/22 (EP 11242 equin Ref M) 5-28-80 (DT850107)11-18-78 BASF.
Derwent Abst. 55316c/32 (DT 2901776 equin Ref N) 7-31-80 (1-18-79), "Production of Blends of Fine Particles Polyolefin . . . Mixing Process".
Derwent Abst. 24762w/15 (GB 1390100) ICI "Particulate Intimate Mixts . . . ", Apr. 9, 1975.
Derwent Abst. 38915y/22 (J5 2049478) Tatsuta Elec., "Polyolefin . . . and Carbon Black", Apr. 20, 1977.

*Primary Examiner*—John C. Bleutge
*Assistant Examiner*—Herbert J. Lilling
*Attorney, Agent, or Firm*—William G. Hopley; Albert E. Koller; James C. Arvantes

[57] ABSTRACT

A process for dispersing fine particle size carbon blacks in low density polyethylene whereby an initially prepared carbon black—low density polyethylene masterbatch, consisting of from 20-50 percent by weight carbon black, is let-down by intensive mixing, in a dry blended mixture of low density polyethylene and high density polyethylene, or propylene polymer, to form an intermediate masterbatch, which is further let-down in low density polyethylene by a second intensive mixing stage. The proportions of each component are chosen to yield a final product consisting of (on a weight basis) from 1-5% carbon black, 1-10% high density polyethylene or propylene polymer, and at least 50% of the remainder being low density polyethylene. The final products so obtained exhibit good carbon black dispersion on a microscopic basis and are essentially free of carbon black agglomerates, the type of which are usually formed by the more standard processes wherein the initial masterbatch is simply let-down into low density polyethylene by only a single intensive mixing stage.

15 Claims, No Drawings

PROCESS FOR DISPERSING CARBON BLACK IN POLYETHYLENE

This invention relates to a process for preparing even dispersions of difficultly dispersible pigments in olefin polymers and more specifically to an improved process for dispersing carbon black of fine particle size in low density polyethylene.

Unpigmented polyethylene, and polyethylene which does not contain appropriate stabilizers, degrades at a relatively rapid rate upon extended exposure to ultraviolet radiation. This can result in the deterioration of mechanical properties such as tensile strength and elongation, the onset of brittleness and discoloration, and the loss of electrical insulation performance. For applications requiring a long outdoor service life, such as wire and cable jacketing and pipe, it is especially important to protect the polymer against such degradation effects. It is well known in the art that the incorporation of carbon black significantly prolongs the life of polyethylene exposed to ultraviolet radiation, and that the degree of such protection depends on the carbon black particle size and its concentration and quality of dispersion in the polymer. Thus, it is typically the objective in many polymer based wire and cable jacketing and pipe products to provide a compound containing a nominal amount of fine particle size carbon black (10-20 nanometers) which is well dispersed on both a macroscopic and microscopic basis.

When incorporated in polyethylene and other polyolefins, carbon black serves to screen and absorb ultraviolet (U.V.) radiation which it subsequently dissipates as thermal energy. Carbon black is still the most effective and economic U.V. inhibitor commercially available.

Besides serving as a U.V. screening agent for polyolefins, carbon black can serve other purposes. For example, versions of fine particle size in sufficient concentration provide a considerable reinforcing effect when the polymer is in the molten state. When so acting, this reduces the tendency of the material to flow, and drip, when subjected to high temperatures as can occur in conflagration situations. Such considerations are particularly important to industrial wiring where flame propagation must be minimized.

Carbon blacks are also commonly used to impart opacity and color to polyethylene film and other commodity products. In such cases, satisfactory dispersion of the carbon black is an important requirement.

The major problem associated with incorporating carbon black of fine primary particle size (10-50 nanometers, nm) in low density polyethylene lies in achieving a uniform dispersion of the black in the polymer. More specifically, the difficulty results from the tendency of such carbon blacks to form agglomerates during the mixing process which, in turn, impart a rough and dull finish to the final product. The presence of such agglomerates can be readily observed on the surface of extruded flat tapes of, say, 100-150 micrometers (4-6 mils) thickness or in films, and such techniques are routinely used for quality control by those familiar with the technology. Besides being deleterious to the appearance of the product, such agglomerates in excessive quantities also reduce the strength of the material and are detrimental to the effectiveness of polyethylene as an electrical insulator. Furthermore, uneven dispersion of the carbon black adversely affects its ability to prevent photodegradation and provide uniform opacity. Thus, ideally, polyethylene resins which incorporate carbon black should be compounded in such a way as to avoid the presence of carbon black agglomerates in the finished product.

Carbon black pigmented polyethylenes are commonly manufactured by the masterbatch route whereby a masterbatch is first made by dispersing a high concentration (typically 20-50 percent by weight) of carbon black in molten polyethylene. After granulation or pelletization, the masterbatch is "let-down" into natural polyethylene by an intensive mixing process so as to provide the desired concentration of carbon black (usually 2-5 percent by weight) in the final product. By intensive mixing is meant a process whereby the carbon black and polymer are subjected to high shear which completely melts the polymer and provides dispersing action such as found in Banbury ® mixers, roll mills and mixing extruders. This product is then usually converted to pellet form by extrusion, after which it can be converted for the intended application, such as blown film or electrical insulation.

Several well known methods are available for manufacturing carbon black masterbatches. For example, a two-roll mill can be used whereby the carbon black is sprinkled onto the fluxed polyethylene (which is maintained molten by the high shear mill) up to the desired concentration. The composition is then milled until the carbon black and polymer are intimately mixed. Besides being slow, costly, and environmentally unattractive due to dusting, this method cannot consistently produce large quantities of pigmented polyethylene which is essentially free of carbon black agglomerates.

Another common method of masterbatch manufacture involves the use of a Banbury ® mixer into which is charged an amount of natural polyethylene and carbon black sufficient to yield a masterbatch of the desired composition. When appropriate, this is sometimes preceded by first dry blending the ingredients in a ribbon blender or other suitable device. The Banbury mixer consists of a jacketed chamber, the cross-section of which describes a horizontal figure eight. Running longitudinally in the chamber are two cored, specially shaped rotors which rotate at slightly different speeds to induce a kneading action between them and a shearing action between the rotors and the chamber inner wall. The bottom of the chamber consists of a sliding gate which serves to discharge the product at the completion of the mixing cycle. At the top of the chamber is a compressed gas or steam operated ram which is cored for cooling and which moves vertically into the hopper. In this way, the ram provides a control for the pressure in the chamber which influences the degree of shear exerted on the ingredients during the mixing. Retraction of the ram at the beginning of the mixing cycle exposes the port through which the resin, carbon black. and other additives are charged into the mixing chamber. Thus, the shear history of the mixing can be varied by adjusting the cooling temperatures of the chamber and rotors, the rotor rpm, ram pressure, material composition, and by other techniques known to those familiar with the art.

A third typical method of preparing carbon black polyethylene masterbatch involves continuous mixers such as the Farrell Continuous Mixer (FCM) ® manufactured by the Farrell Company. The principle of operation is essentially the same as that for the Banbury mixer, except that the process is continuous rather than of the batch mode.

Other less common techniques of producing carbon black masterbatches using different types of compounding equipment are also known to those familiar with the art.

The masterbatch method for making black pigmented low density polyethylene products has economic and hygenic benefits, and it is generally advantageous to produce masterbatches with as high a carbon black content as possible. However, when using fine particle size blacks (<50 nm), the upper limit of concentration is typically restricted to less than 50% loading, due to the dramatic reinforcing effect that fine particle size blacks have on the viscosity of the resulting mixture. In other words, at too high concentrations, the masterbatch cannot be easily blended or "let-down" in natural resin. Furthermore, masterbatches produced by the above methods are very often less than satisfactory for critical applications due to the tendency of formation of hard, undispersible carbon black agglomerates which are formed in the masterbatch step, even at loadings considerably lower than 50% by weight carbon black. Once formed, it is virtually impossible, by the heretofore conventional methods, to disperse such agglomerates in the final "let-down" stage. The agglomerates formed are typically about 0.5-2 mm in size.

Several techniques are known for producing improved quality carbon black—low density polyethylene masterbatches made by the above processes. One version is to employ fine screen packs to filter the agglomerates from the masterbatch during the extrusion and pelletization stage. This approach is costly and inconvenient, and involves considerable expenditure for capital equipment since screen packs must be changed continually for efficiency.

Another documented method (Canadian Pat. No. 929,966) involves adding water during the masterbatch stage. Though this technique yields a high quality product, it is generally undesirable from an environmental and economic viewpoint. Specifically, considerable steam and dusting is generated, and the water interacting with acids in the carbon black can cause severe corrosion problems in equipment made of ordinary carbon steel.

With respect to the present invention, it has now been discovered that high quality carbon black—low density polyethylene products can be prepared by an economically practical process and that so prepared products have excellent dispersion ratings and significantly fewer agglomerates than similar products made by the above described standard processes.

It is therefore an object of one aspect of this invention to provide an improved process for dispersing carbon black of fine particle size in low density polyethylene.

It is an object of another aspect of this invention to provide a process for preparing a carbon black-polyethylene masterbatch having uniform dispersion properties.

These and other objects are obtained by means of a process which comprises:

(A) intensive mixing from 20% to 50% by weight of carbon black with from 80% to 50% by weight of a low density polyethylene to produce an initial masterbatch blend, then (B) intensive mixing said initial masterbatch blend with (i) a polymer selected from the group consisting of high density polyethylene and propylene polymers, and (ii) low density polyethylene to produce an intermediate masterbatch blend wherein the amount of carbon black is from 1.1% to 46% by weight, the amount of polymer is from 9% to 85% by weight and the amount of total low density polyethylene is at least 5% by weight of the total intermediate masterbatch blend, then (C) intensive mixing said intermediate masterbatch blend with a further amount of low density polyethylene so that the proportion of carbon black in the product is from 1.0% to 5% by weight and the proportion of polymer is from 1.0% to 10% by weight of the total composition, at least 50% of the remainder being low density polyethylene.

It is preferred that all the ingredients relevant to each particular stage be charged simultaneously, and most preferred that the subject ingredients be first dry blended before charging to the mixer. It is also recognized that other additives, such as anti-oxidants, etc., which do not significantly affect the carbon black dispersion efficiency can be incorporated in the normal minor amounts well known to those familiar with the art, and that such modifications do not impair the novelty of the subject process invention.

The low density polyethylenes employed in the initial masterbatch and subsequent "let-down" steps of the invention are characterized by a specific gravity in the range from 0.910 to 0.924, based on the pure polymer resin. The same base resins should also have a melt index according to the 1976 Annual Book of ASTM Standards, Part 35, Procedure D 1238-73, in the range from 0.1 to 20.0 dg/min, preferably from 0.2 to 6 dg/min, and most preferably from 1.0-3.0 dg/min. Furthermore, the polymer may be manufactured by any of the commercially available processes known to those familiar with the art.

When high density polyethylene is used to produce the intermediate masterbatch in the above described process, such high density polyethylene will typically have a specific gravity ranging from 0.940 to 0.965 based on the pure polymer resin. The same high density polyethylene will also possess a melt index according to the 1976 Annual Book of ASTM Standards, Part 35, Procedure D-1238-73, in the range from 0.10 to 10 dg/min. preferably 0.2 to 4 dg/min, and most preferably from 0.2 to 1.0 dg/min. Furthermore, the high density polyethylene may be manufactured by any of the commercial processes known to those familiar with the art.

It is also relevant to the present invention that the high density polyethylene component used to manufacture the intermediate masterbatch can be substituted by another polymer, preferably polypropylene and certain of its copolymers which are sufficiently miscible with low density polyethylene and which have a melting point significantly higher than that of low density polyethylene but also low enough such that such polymers can be readily fluxed in the intensive mixers used for the described process. Therefore, such propylene polymers should have a melt index according to ASTM Procedure D 1238-L between 0.1 and 10 dg/min, preferably between 0.2 and 4 dg/min, and most preferably between 0.2 and 1.0 dg/min. Other considerations of such a polymer will be apparent to the user depending on the intended application of the final product.

The carbon black of the present invention may be any of the standard commercially available carbon blacks such as furnace black, channel black, acetylene black, etc. and will be characterized by an average primary particle size in the range of 5 to 100 nm, preferably 10 to 50 nm, and most preferably 15–30 nm.

With regard to the compositions used in the process, the initial masterbatch can consist of 20 to 50 percent by weight of the carbon black, preferably 25 to 40 percent by weight of the carbon black, and most preferably 30 to 35 percent by weight of the carbon black mixed in low density polyethylene correspondingly of 80 to 20 weight percent, preferably 75 to 60 weight percent, and most preferably 70 to 65 percent of the initial masterbatch.

The composition of the intermediate masterbatch will consist of 1.1 to 46.0 weight percent, preferably 4.4 to 35.0 weight percent, and most preferably 12.0 to 26.0 weight percent of the carbon black, and 9.0 to 85.0 weight percent, preferably 9.0 to 65.0 weight percent, and most preferably 18.0 to 47.0 weight percent of the high density polyethylene or polypropylene, and 5.0 to 89.9 weight percent, preferably 20.0 to 75.0 weight percent, and most preferably 34.0 to 63.0 weight percent of low density polyethylene.

With regard to the additions of the low density polyethylene used to manufacture the intermediate masterbatch, and the low density polyethylene used to manufacture the final product, such additions are made so as to produce a final product consisting of from 1 to 5 percent by weight, preferably 1.5 to 4.0 percent by weight, and most preferably 2 to 3 percent by weight of the carbon black, and from 1 to 10 percent by weight, preferably 2 to 6 percent by weight, and most preferably 3 to 5 percent by weight of the high density polyethylene or polypropylene and at least 50% of the remainder of the final product being low density polyethylene.

The following examples are illustrative of the surprising and unexpected performance of the discovered process for effecting an improved degree of dispersion of fine particle size carbon black in low density polyethylene, and should not be regarded as limiting the scope of the invention.

EXAMPLE 1

An initial masterbatch consisting of 25% by weight of carbon black, having an average primary particle size of 17 nm, and 75% by weight of low density polyethylene, (melt index=2.2 dg/min, specific gravity=0.918 g/cm$^3$), was mixed in a Size 9 Farrell Continuous Mixer. After granulation, 1300 g of the initial masterbatch was further mixed with 1287 g of the low density polyethylene and 13 g of the antioxidant 4-4'-thiobis-(6-tert-butyl-m-cresol) in a Banbury ® Mixer (model 00) to produce an intermediate masterbatch consisting of 12.5 percent by weight of the carbon black, 87% by weight of the low density polyethylene, and 0.5 percent by weight of antioxidant. After granulation, 520 g of this intermediate masterbatch was then again "let-down" in the same Banbury Mixer with 2080 g of the low density polyethylene to produce the final product consisting of 2.5 percent by weight of carbon black, 97.4 percent by weight of low density polyethylene, and 0.1 percent by weight of antioxidant.

For both production of the intermediate masterbatch and the final product, the Banbury was operated with neutral cooling on the jacket and rotors, cooling water on the gate, and 120 psig air pressure on the ram. The rotor speed was 60 rpm and the mixing cycle was 10 minutes. The temperature-shear history of the batch in each case was, therefore, determined by the above (fixed) mixing conditions and the compositions used.

This final product was then extruded into long tapes 125 micrometers (5 mils) thick and about 6 cm wide on a Wilmod ® 1-in. extruder for evaluation of carbon black dispersion quality. This example provides the basis of comparison for the following two examples (Nos. 2 and 3).

EXAMPLE 2

Thirteen hundred grams (1300 g) of the initial masterbatch used in Example 1 was mixed with 1300 g of a dry blend consisting of 260 g of a pelletized high density polyethylene, (melt index=0.2 dg/min., specific gravity=0.950), a further 1027 g of the low density polyethylene described in Example 1 and 13 g of the antioxidant described in Example 1 in the Banbury Mixer to produce an intermediate masterbatch consisting of 10 percent by weight of the high density polyethylene, 12.5 percent by weight of the carbon black, 77.0 percent by weight of the low density polyethylene, and 0.5 percent by weight of the antioxidant. This intermediate masterbatch was then let-down into low density polyethylene in a fashion identical to that used in Example 1, to produce a final product consisting of 2 percent by weight of the of the high density polyethylene, 2.5 percent by weight of the carbon black, 95.4 percent by weight of the low density polyethylene, and 0.1 percent by weight of the antioxidant. Tapes, as described in Example 1, were extruded for evaluation of carbon black dispersion quality. Mixing conditions were identical to those of Example 1.

EXAMPLE 3

This case corresponded to Example 2 except that 1300 g of the initial masterbatch was mixed with 1300 g of a dry blend consisting of 780 g of the high density polyethylene, 507 g of the low density polyethylene, and 13 g of the antioxidant to provide an intermediate masterbatch consisting of 30 percent by weight of high density polyethylene, 12.5 percent by weight of the carbon black, 57.0 percent by weight of low density polyethylene, and 0.5 percent by weight of the antioxidant. This resulting intermediate masterbatch was subsequently let down in low density polyethylene to provide a final product consisting of 91.4 percent by weight of low density polyethylene, 6.0 percent by weight of high density polyethylene, 2.5 percent by weight of the carbon black, and 0.1 percent by weight of the antioxidant. Tapes were again extruded on this final product for analysis.

On comparison, the tapes produced from Examples 2 and 3 were markedly superior to that made by Example 1 in which no high density polyethylene was incorporated, and the tape from Example 3 was the best of all. More specifically, the tapes of Examples 2 and 3 showed the carbon black to be more uniformly dispersed on a microscopic basis under 100 times magnification, and they both had smoother surfaces than those of Example 1. Moreover, they were essentially free of carbon black agglomerates, the type of which were readily visible on the surfaces of the tape produced in Example 1.

EXAMPLE 4

This example was similar to Example 1 except that the initial granulated masterbatch consisted of 31 percent by weight of the carbon black and 69 percent by weight of the low density polyethylene. Thirteen hundred grams (1300 g) of this initial low density polyethylene masterbatch was then mixed with 1287 g of low density polyethylene and 13 g of the antioxidant to produce an intermediate masterbatch consisting of 15.5 percent by weight of carbon black, 84.0 percent by weight low density polyethylene, and 0.5 percent by weight antioxidant. After granulation, the intermediate masterbatch was diluted 6.2 times by mixing with 100% low density polyethylene, to yield the final product consisting of 2.5 percent by weight carbon black, 97.4 percent by weight low density polyethylene, and about 0.1 percent by weight antioxidant. Thus, no high density polyethylene was incorporated. Tapes were extruded from the final product and compared to those made in the following two examples:

EXAMPLE 5

This case was similar to Example 4 except that 1300 g of the initial masterbatch (31% carbon black, 69% low density polyethylene) was first mixed with 1027 g of low density polyethylene, 260 g of high density polyethylene and 13 g of antioxidant to produce an intermediate masterbatch consisting of 15.5 percent by weight carbon black, 10 percent by weight high density polyethylene, 74 percent by weight low density polyethylene, and 0.5 percent by weight antioxidant. On dilution by 6.2 times with low density polyethylene in the second mixing stage, a final product was made consisting of 2.5 percent by weight carbon black, 1.6 percent by weight high density polyethylene, 95.8 percent by weight low density polyethylene, and about 0.1 percent by weight antioxidant. Tapes were extruded on this product.

EXAMPLE 6

This case was the same as Example 5 except that 1300 g of the initial masterbatch was first mixed with 780 g of the high density polyethylene, 507 g of the low density polyethylene, and 13 g of antioxidant to produce the intermediate masterbatch consisting of 15.5 percent by weight carbon black, 30.0 percent by weight high density polyethylene, 54 percent by weight low density polyethylene, and 0.5 percent by weight antioxidant. On dilution by 6.2 times with low density polyethylene in the second mixing stage, a final product was produced consisting of 2.5 percent by weight carbon black, 4.8 percent by weight high density polyethylene, 92.6 percent by weight low density polyethylene, and about 0.1 percent by weight antioxidant. As described in Example 1 tapes were extruded on this product.

The tapes produced from Examples 4, 5 and 6 reproduced the results observed with Examples 1 to 3. More specifically, the tapes from Examples 5 and 6 were superior to that made by Example 4, in which no high density polyethylene was incorporated, in that the carbon black was more uniformly dispersed under 100 times magnification, the tapes had a smoother finish, and were virtually free of the carbon black agglomerates which were readily apparent on the tape produced by Example 4. The tape of Example 6, which contained the most high density polyethylene, was the best of the three, again demonstrating that the dispersion of carbon black improved as the high density polyethylene fraction was increased in the intermediate masterbatch.

EXAMPLE 7

This case was similar to Example 1 except that the carbon black employed had an average primary particle size = 19 nm and the low density polyethylene component had a melt index of 0.2 dg/min and a specific gravity of 0.9200.

EXAMPLE 8

This case was similar to Example 3 except that it also employed the same carbon black and low density polyethylene as Example 7. The final product thus contained 6.0 percent by weight of the high density polyethylene.

Compared to that of Example 7, the tape of Example 8 possessed markedly improved dispersion of the carbon black and was free of the carbon black agglomerates evident on the tape of Example 7, again attesting to the beneficial effect of incorporating high density polyethylene by the presently described process.

The following three examples demonstrate the effectiveness of the present invention wherein the high density polyethylene component is substituted by propylene polymer.

EXAMPLE 9

This case was similar to Example 1 except that the intermediate masterbatch was produced by mixing 22.5 g of the initial masterbatch (25 percent by weight of carbon black) with 22.275 g of the low density polyethylene and 0.225 g of the antioxidant in a Brabender Plasticorder ® to yield several 45 g batches of the intermediate masterbatch consisting of 12.5 percent by weight carbon black, 87.0 percent by weight low density polyethylene, and 0.5 percent by weight antioxidant. The Brabender Plasticorder was operated at a rotor speed of 40 rpm, a jacket temperature of 180° C., and a mixing time of 10 minutes. Sixty grams (60 g) of the so produced intermediate masterbatch was then "let-down" into 240 g of the low density polyethylene on a laboratory differential two-roll mill to yield the final product consisting of 2.5 percent by weight carbon black, 97.4 percent by weight low density polyethylene, and 0.1 percent by weight antioxidant. For this "let-down", the roll-mill was operated at 170° C. and 50 rpm, and the material was fluxed for 10 minutes.

Tapes of 1.5 cm width and 125 micrometers (5 mil) were extruded on the final product. The tapes were also made on the Brabender Plasticorder converted to a small extruder made with a suitably adapted die.

EXAMPLE 10

With respect to product composition, this case was identical to Example 2 except that the high density polyethylene was substituted by Profax 6531 ®, propylene polymer manufactured by Hercules Corp. (melt index by ASTM D-1238-L is 4 dg/min, specific gravity = 0.902, melting point = 162° C.). The mixing and "let-down" conditions were those described in Example 9. The final product thus produced consisted of 95.4 percent by weight low density polyethylene, 2.5 percent by weight carbon black, 2.0 percent by weight Profax 6531, and 0.1 percent by weight antioxidant. Tapes were prepared as described in Example 9.

EXAMPLE 11

With respect to material composition, this case was identical to Example 3 except that Profax 6531 was again substituted for the high density polyethylene. Mixing and "let-down" conditions were again those described in Example 9 as was the method of preparing the tape. The final product thus consisted of 91.4 percent by weight low density polyethylene, 6.0 percent by weight propylene polymer, 2.5 percent by weight carbon black, and 0.1 percent by weight antioxidant.

The tapes prepared from Examples 10 and 11 displayed fewer carbon black agglomerates on a unit area basis than the tape obtained from Example 9, demonstrating the beneficial effect on carbon black dispersion of incorporating a propylene polymer in the manufacture of the intermediate masterbatch. In order of tape quality, that from Example 11 was better than that of Example 10, which was better than that of Example 9, the case where no propylene polymer was used.

With regard to the method of applying the described invention, it was confirmed by laboratory testing that direct incorporation of the high density polyethylene, into the initial masterbatch at the time of manufacture of the initial masterbatch did not yield a carbon black masterbatch that was readily dispersible into low density polyethylene, even when the masterbatch was doubly "let-down" into low density polyethylene. Such tests actually produced the worst product of all. Thus was demonstrated the surprisingly beneficial effect achieved when the high density polyethylene or propylene polymer is employed to manufacture the intermediate masterbatch by fashion described in this process invention.

The embodiments of the invention in which an exclusive property or privilege is claimed are defined as follows:

1. A process for producing a polyethylene composition having fine particle size carbon black dispersed therein which process comprises:
   (A) intensive mixing from 20% to 50% by weight of carbon black with from 80% to 50% by weight of a low density polyethylene to produce an initial masterbatch blend, then
   (B) intensive mixing by kneading action said initial masterbatch blend with (i) a polymer selected from the group consisting of high density polyethylene and a propylene polymer, and (ii) low density polyethylene to produce an intermediate masterbatch blend wherein the amount of carbon black is from 1.1% to 46% by weight, the amount of polymer is from 9% to 85% by weight and the amount of total low density polyethylene is at least 5% by weight of the total intermediate masterbatch blend, then
   (C) intensive mixing said intermediate masterbatch blend with a further amount of low density polyethylene so that the proportion of carbon black in the product is from 1.0% to 5% by weight and the proportion of polymer is from 1.0% to 10% by weight of the total composition, at least 50% of the remainder being low density polyethylene.

2. A process as claimed in claim 1 wherein said carbon black has a primary particle size of from 5 nm to 100 nm.

3. A process as claimed in claim 2 wherein said low density polyethylene has a specific gravity of from 0.910 to 0.924 and a melt index of from 0.1 to 20.0 dg/min.

4. A process as claimed in claim 3 wherein said polymer is high density polyethylene having a specific gravity of from 0.940 to 0.965 and a melt index of from 0.10 to 10.0 dg/min.

5. A process as claimed in claim 3 wherein said polymer is a propylene polymer having a melt index of from 0.1 to 10.0 dg/min.

6. A process for producing a polyethylene composition having fine particle size carbon black dispersed therein which process comprises:
   (A) intensive mixing from 25% to 40% by weight of carbon black having a primary particle size of from 5 nm to 100 nm with from 75% to 60% by weight of a low density polyethylene having a specific gravity of from 0.910 to 0.924 and a melt index of from 0.1 to 20.0 dg/min., to produce an initial masterbatch blend, then
   (B) intensive mixing by kneading action said initial masterbatch blend with (i) a polymer selected from the group consisting of high density polyethylene having a specific gravity of from 0.940 to 0.965 and a melt index of from 0.1 to 10.0 dg/min., and a propylene polymer having a melt index of from 0.1 to 10.0 dg/min., and (ii) low density polyethylene having a specific gravity of from 0.910 to 0.924 and a melt index of from 0.1 to 20.0 dg/min., to produce an intermediate masterbatch blend wherein the amount of carbon black is from 4.4% to 35.0% by weight, and the amount of polymer is from 65% to 9.0% by weight and the weight of the low density polyethylene is at least 15% by weight of the total intermediate masterbatch, then
   (C) intensive mixing said intermediate masterbatch blend with a further amount of low density polyethylene having a specific gravity of from 0.910 to 0.924 and a melt index of from 0.1 to 20.0 dg/min., so that the proportion of carbon black in the product is from 1.0% to 4.0% by weight and the proportion of polymer is from 2.0% to 6.0% by weight of the total composition, at least 75% of the remainder being low density polyethylene.

7. A process as claimed in claim 6 wherein said carbon black has a primary particle size of from 10 nm to 50 nm.

8. A process as claimed in claim 7 wherein said low density polyethylene has a specific gravity of from 0.910 to 0.924 and a melt index of from 0.2 to 6.0 dg/min.

9. A process as claimed in claim 8 wherein said polymer is high density polyethylene having a specific gravity of from 0.940 to 0.965 and a melt index of from 0.2 to 4.0 dg/min.

10. A process as claimed in claim 8 wherein said polymer is a propylene polymer having a melt index of from 0.2 to 4.0 dg/min.

11. A process for producing a polyethylene composition having fine particle size carbon black dispersed therein, which process comprises:
    (A) intensive mixing 30% to 35% by weight of carbon black having a primary particle size of from 5 nm to 100 nm with from 70% to 65% by weight of a low density polyethylene having a specific gravity of from 0.910 to 0.924 and a melt index of from 0.1 to 20.0 dg/mn., to produce an initial masterbatch blend, then
    (B) intensive mixing by kneading action said initial masterbatch blend with (i) a polymer selected from the group consisting of high density polyethylene having a specific gravity of from 0.940 to 0.965 and a melt index of from 0.1 to 10.0 dg/min., and a propylene polymer having a melt index of from 0.1 to 10.0 dg/min., and (ii) low density polyethylene having a specific gravity of from 0.910 to 0.924 and a melt index of from 0.1 to 20.0 dg/min., to produce an intermediate masterbatch blend wherein the amount of carbon black is from 12% to 26% by weight and the amount of polymer is from 47% to 18% by weight, the weight of the low density polyethylene is at least 30% by weight of the total intermediate masterbatch, then (C) intensive mixing said intermediate masterbatch blend with a further amount of low density polyethylene having a specific gravity of from 0.910 to 0.924 and a melt index of from 0.1 to 20.0 dg/min., so that the proportion of carbon black in the product is from 2% to 3% by weight and the proportion of polymer is from 3% to 5% by weight of the total composition, at least 85% of the remainder being low density polyethylene.

12. A process as claimed in claim 11 wherein said carbon black has a primary particle size of from 15 nm to 30 nm.

13. A process as claimed in claim 12 wherein said low density polyethylene has a specific gravity of from 0.910 to 0.924 and a melt index of from 1.0 to 3.0 dg/min.

14. A process as claimed in claim 13 wherein said polymer is high density polyethylene having a specific gravity of from 0.940 to 0.965 and a melt index of from 0.2 to 1.0 dg/min.

15. A process as claimed in claim 13 wherein said polymer is a propylene polymer having a melt index of from 0.2 to 1.0 dg/min.

* * * * *